US010948957B1

(12) United States Patent
Chaouat et al.

(10) Patent No.: US 10,948,957 B1
(45) Date of Patent: Mar. 16, 2021

(54) ADAPTIVE ON-CHIP DIGITAL POWER ESTIMATOR

(71) Applicant: Apple Inc., Cupertino, CA (US)

(72) Inventors: Laurent F. Chaouat, Jonestown, TX (US); Saharsh Samir Oza, Austin, TX (US); Hamza Saigol, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/584,202

(22) Filed: Sep. 26, 2019

(51) Int. Cl.
*G06F 1/30* (2006.01)
*G06F 1/26* (2006.01)
*G04F 10/00* (2006.01)

(52) U.S. Cl.
CPC .............. *G06F 1/26* (2013.01); *G04F 10/005* (2013.01)

(58) Field of Classification Search
CPC ...... G06F 1/3203; G06F 2201/86; G06F 1/26; G06F 2201/81; G06F 11/30; G06F 3/0634; G06F 1/30
USPC .................................. 375/142, 240.02, 224
See application file for complete search history.

(56) References Cited

U.S. PATENT DOCUMENTS

| | | | |
|---|---|---|---|
| 5,719,800 A | 2/1998 | Mittal et al. | |
| 6,564,328 B1 | 5/2003 | Grochowski et al. | |
| 7,249,289 B2* | 7/2007 | Muranaka | G06F 11/1008 714/48 |
| 7,437,581 B2 | 10/2008 | Grochowski et al. | |
| 7,533,003 B2* | 5/2009 | Floyd | G06F 11/3466 702/186 |
| 7,793,125 B2 | 9/2010 | Berry, Jr. et al. | |
| 7,915,910 B2 | 3/2011 | von Kaenel | |
| 8,010,822 B2 | 8/2011 | Marshall et al. | |
| 8,010,824 B2* | 8/2011 | Naffziger | G06F 1/3203 713/340 |
| 8,190,930 B2 | 5/2012 | Herdrich et al. | |

(Continued)

FOREIGN PATENT DOCUMENTS

| | | |
|---|---|---|
| EP | 2348410 A2 | 7/2011 |
| TW | I299118 B | 7/2008 |
| WO | WO2011147777 A2 | 12/2011 |

OTHER PUBLICATIONS

International Search Report and Written Opinion in International Application No. PCT/US2014/034695, dated Aug. 4, 2014, 12 pages.

(Continued)

*Primary Examiner* — Emmanuel Bayard
(74) *Attorney, Agent, or Firm* — Kowert Hood Munyon Rankin and Goetzel PC; Rory D. Rankin

(57) ABSTRACT

Systems, apparatuses, and methods for implementing a dynamic power estimation (DPE) unit that adapts weights in real-time are described. A system includes a processor, a DPE unit, and a power management unit (PMU). The DPE unit generates a power consumption estimate for the processor by multiplying a plurality of weights by a plurality of counter values, with each weight multiplied by a corresponding counter. The DPE unit calculates the sum of the products of the plurality of weights and plurality of counters. The accumulated sum is used as an estimate of the processor's power consumption. On a periodic basis, the estimate is compared to a current sense value to measure the error. If the error is greater than a threshold, then an on-chip learning algorithm dynamically adjust the weights. The PMU uses the power consumption estimates to keep the processor within a thermal envelope.

20 Claims, 7 Drawing Sheets

(56) References Cited

U.S. PATENT DOCUMENTS

| | | | |
|---|---|---|---|
| 8,271,812 B2 | 9/2012 | de Cesare et al. | |
| 8,381,006 B2 | 2/2013 | Flachs et al. | |
| 8,756,442 B2 | 6/2014 | Naffziger et al. | |
| 8,788,850 B1 | 7/2014 | Kaul et al. | |
| 9,195,291 B2 | 11/2015 | Lee | |
| 9,304,573 B2 | 4/2016 | Lee et al. | |
| 9,606,605 B2 | 3/2017 | Mylius et al. | |
| 2002/0062454 A1* | 5/2002 | Fung | G06F 3/0634 713/300 |
| 2003/0065960 A1 | 4/2003 | Rusu et al. | |
| 2003/0125900 A1* | 7/2003 | Orenstien | G06F 1/3203 702/132 |
| 2003/0126478 A1 | 7/2003 | Burns et al. | |
| 2003/0126479 A1 | 7/2003 | Burns et al. | |
| 2004/0193934 A1 | 9/2004 | Kahn | |
| 2006/0149975 A1 | 7/2006 | Rotem et al. | |
| 2008/0036613 A1 | 2/2008 | Gaskins et al. | |
| 2008/0082844 A1 | 4/2008 | Ghiasi et al. | |
| 2008/0104425 A1 | 5/2008 | Gunther et al. | |
| 2009/0172424 A1 | 7/2009 | Cai et al. | |
| 2009/0271646 A1 | 10/2009 | Talwar et al. | |
| 2010/0037038 A1 | 2/2010 | Bieswanger et al. | |
| 2010/0058078 A1* | 3/2010 | Branover | G06F 1/3203 713/300 |
| 2010/0095137 A1 | 4/2010 | Bieswanger et al. | |
| 2010/0268930 A1* | 10/2010 | Bose | G06F 11/3062 713/100 |
| 2010/0268968 A1 | 10/2010 | Ghiasi et al. | |
| 2010/0268974 A1* | 10/2010 | Floyd | G06F 1/3203 713/340 |
| 2010/0268975 A1* | 10/2010 | Bose | G06F 11/348 713/340 |
| 2011/0093724 A1 | 4/2011 | Park et al. | |
| 2011/0093733 A1 | 4/2011 | Kruglick | |
| 2011/0213950 A1 | 9/2011 | Mathieson et al. | |
| 2011/0301889 A1* | 12/2011 | Naffziger | H05K 7/20836 702/62 |
| 2012/0017188 A1* | 1/2012 | Lepak | G06F 30/33 716/109 |
| 2012/0030481 A1* | 2/2012 | Bose | G06F 1/3206 713/300 |
| 2012/0054519 A1 | 3/2012 | Branover et al. | |
| 2012/0260117 A1* | 10/2012 | Acar | G06F 1/3243 713/340 |
| 2013/0007413 A1 | 1/2013 | Thomson et al. | |
| 2013/0024713 A1 | 1/2013 | Bajic et al. | |
| 2013/0097415 A1 | 4/2013 | Li et al. | |
| 2013/0117596 A1* | 5/2013 | Furukawa | G06F 11/3466 713/340 |
| 2015/0026109 A1* | 1/2015 | Park | G06N 3/0427 706/21 |
| 2015/0177799 A1* | 6/2015 | Gendler | G06F 1/26 713/300 |
| 2015/0212947 A1* | 7/2015 | Henry | G06F 1/3243 713/323 |
| 2016/0124481 A1* | 5/2016 | Avadhanam | G06F 1/28 713/340 |
| 2016/0378168 A1* | 12/2016 | Branover | G06F 1/3243 713/323 |
| 2017/0371761 A1* | 12/2017 | Piga | G06F 11/3604 |

OTHER PUBLICATIONS

Non-Final Office Action in U.S. Appl. No. 13/924,164, dated Jun. 19, 2015, 14 pages.

Office Action in Taiwanese Patent Application No. 103116144, dated Jun. 26, 2015, 15 pages.

International Search Report and Written Opinion in International Application No. PCT/US2020/049162, dated Dec. 4, 2020, 13 pages.

Huang et al., "Accurate Fine-Grained Processor Power Proxies", Micro-45: Proceedings of the 2012 45th Annual IEEE/ACM International Symposium on Microarchitecture, Dec. 2012, pp. 224-234.

* cited by examiner

ADAPTIVE ON-CHIP DIGITAL POWER ESTIMATOR

BACKGROUND

Technical Field

Embodiments described herein relate to the field of computing systems and, more particularly, to dynamically adjusting weights so as to more accurately estimate the power consumed by a processing unit.

Description of the Related Art

When generating an estimate of the power being consumed by a processing unit, the estimate is typically based on offline assumptions about the processing unit. These pre-silicon estimates are based on the types of workloads the processing unit is expected to execute. However, these estimates typically fail to provide an accurate assessment of the real-time power being consumed, which can fluctuate based on which application is being executed and/or other factors (e.g., power supply variations, temperature changes).

In view of the above, improved methods and mechanisms for generating power consumption estimates are desired.

SUMMARY

Systems, apparatuses, and methods for implementing a dynamic power estimation unit that adjusts weights in real-time are contemplated. In various embodiments, a computing system includes a processor, a dynamic power estimation unit, and a power management unit. In one embodiment, the dynamic power estimation unit generates a power consumption estimate for the processor by multiplying a plurality of weights by a plurality of counter values, with each weight multiplied by a corresponding counter. The dynamic power estimation unit calculates the sum of the products of the plurality of weights and the plurality of counters. The accumulated sum is used as an estimate of power consumption for the processor. On a periodic basis, the estimate is compared to a current sense value to measure the error. If the error is greater than a threshold, then an on-chip learning algorithm is implemented to dynamically adjust the weights. By adjusting the weights in real-time, more accurate power consumption estimates are generated. The power management unit uses the power consumption estimates to keep the processor within a thermal envelope.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
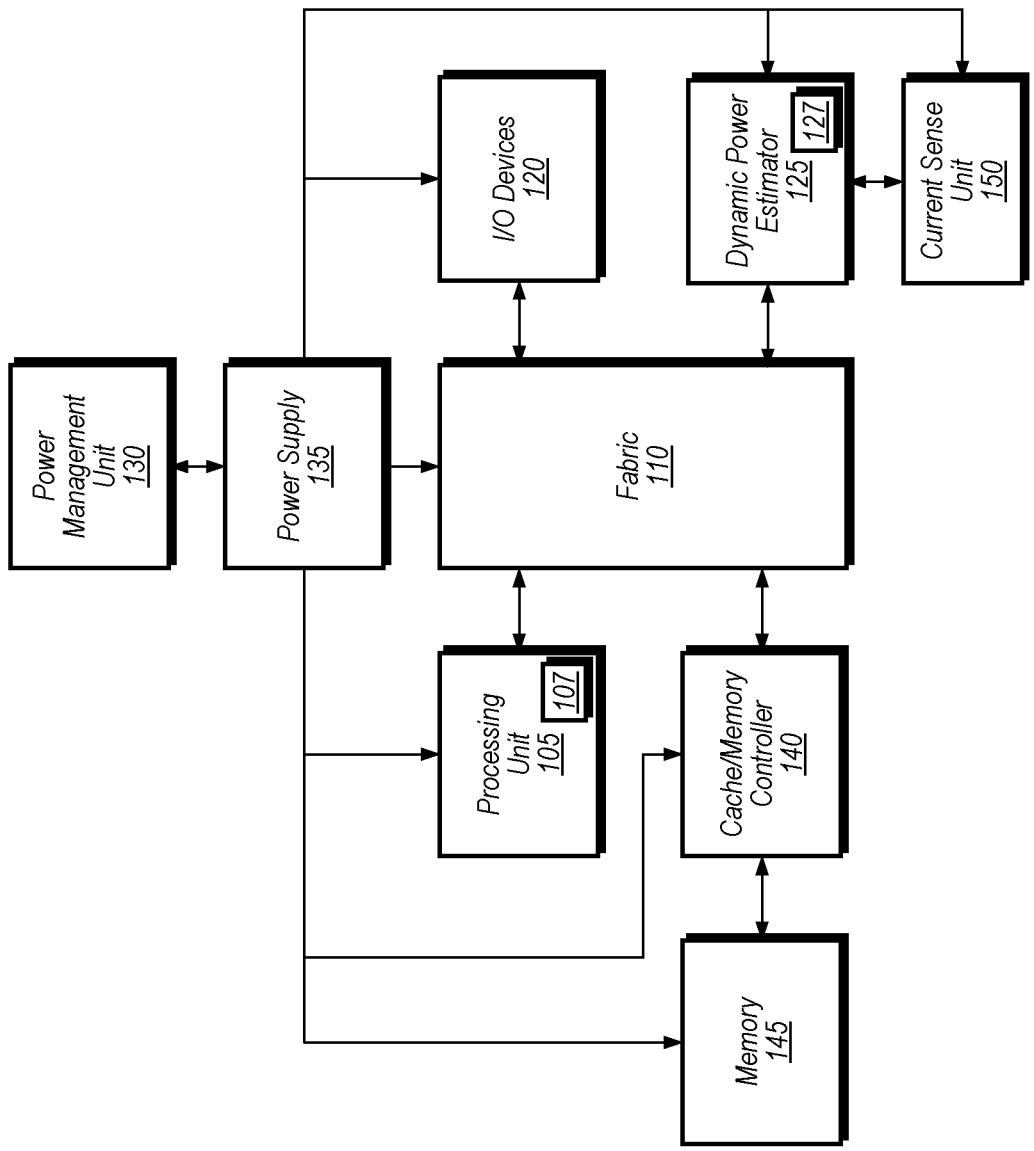
FIG. 1 is a generalized block diagram of one embodiment of a computing system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring now to FIG. 1, a block diagram of one embodiment of a computing system 100 is shown. In one embodiment, computing system 100 includes a plurality of components such as a processing unit 105, fabric 110, input/output (I/O) devices 120, dynamic power estimator (DPE) 125, power management unit (PMU) 130, power supply 135, cache/memory controller 140, memory 145, and current sense unit 150. In other embodiments, computing system 100 includes other components and/or one or more of the components are omitted. Also, in other embodiments, the components of computing system 100 may be connected in other suitable manners.

Processing unit 105 is representative of any number and type of processing units (e.g., central processing unit (CPU), graphics processing unit (GPU), field programmable gate array (FPGA), application specific integrated circuit (ASIC), digital signal processor (DSP)). Processor unit 105 includes any number of cores (not shown) for executing instructions of a particular instruction set architecture (ISA), with the instructions including operating system instructions and user application instructions. Processing unit 105 also includes event counters 107, which are representative of any number and type of event counters for tracking the occurrence of different types of events that occur during the execution of one or more applications. These events may include instructions executed, cache misses, memory requests, page table misses, branch mispredictions, and/or other types of events.

As shown, processing unit 105 is connected to one or more I/O devices 120 and cache/memory controller 140 via fabric 110. Also, processing unit 105 accesses memory 145 via cache/memory controller 140. In one embodiment, memory 145 is external computer memory, such as non-volatile memory or dynamic random access memory (DRAM). The non-volatile memory may store an operating system (OS) for the computing system 100. Instructions of a software application may be loaded into a cache memory subsystem (not shown) within the processing unit 105. The software application may have been stored in one or more of the non-volatile memory, DRAM, and/or one of the I/O devices 120. The processing unit 105 may load the software application instructions from the cache memory subsystem and process the instructions.

Fabric 110 may include various interconnects, buses, MUXes, controllers, etc., and may be configured to facilitate communication between various elements of computing system 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

Cache/memory controller 140 may be configured to manage transfer of data between fabric 110 and one or more caches and/or memories (e.g., non-transitory computer readable mediums). For example, cache/memory controller 140 may be coupled to an L3 cache, which may, in turn, be coupled to a system memory (e.g., memory 145). In other embodiments, cache/memory controller 140 may be directly coupled to memory 145. The memory 145 may provide a non-volatile, random access secondary storage of data. In one embodiment, the memory 145 may include one or more hard disk drives (HDDs). In another embodiment, the memory 145 utilizes a Solid-State Disk (SSD) and/or DRAM. The DRAM may be a type of dynamic random-access memory that stores each bit of data in a separate capacitor within an integrated circuit. Unlike HDDs and flash memory, the DRAM may be volatile memory, rather than non-volatile memory. The DRAM may include a multi-channel memory architecture. This type of architecture may increase the transfer speed of data to the cache/memory controller 140 by adding more channels of communication between them.

I/O devices 120 are representative of any number and type of I/O and/or peripheral devices. One or more of the I/O devices 120 may be a display such as a touchscreen, a modern TV, a computer monitor, or other type of display. The computer monitor may include a thin film transistor liquid crystal display (TFT-LCD) panel. Additionally, the display may include a monitor for a laptop and other mobile devices. A video graphics subsystem (not shown) may be used between the display and the processing unit 105. The video graphics subsystem may be a separate card on a motherboard and include a graphics processing unit (GPU). One or more of the I/O devices 120 may be one of a typically utilized I/O device such as a keyboard, mouse, printer, modem, and so forth Power supply 135 provides power supply voltages to the various components of system 100. Also, in one embodiment, power supply 135 supplies a clock frequency to the components which require a clock for operation. For example, in this embodiment, power supply 135 includes one or more phase-locked loops (PLLs) (not shown) for supplying the one or more clocks to the various components. Alternatively, the PLLs may be separate from power supply 135. Power management unit (PMU) 130 is coupled to power supply 135, and PMU 130 control the specific voltages and/or frequencies provided to the various components based on the real-time operating conditions of system 100. In one embodiment, a power consumption estimate generated by DPE 125 is conveyed to PMU 130, and PMU 130 uses the power consumption estimate (i.e., power consumption prediction) to determine whether to increase or decrease the power performance states of the various components of system 100. For example, in one embodiment, if the power consumption prediction generated by DPE 125 is less than a first threshold, then PMU 130 increases the power performance state of processing unit 105 and/or one or more other components. Alternatively, if the power consumption prediction generated by DPE 125 is greater than a second threshold, then in one embodiment, PMU 130 decreases the power performance state of processing unit 105 and/or one or more other components.

In one embodiment, DPE 125 generates a power consumption estimate for processing unit 105 by multiplying coefficients 127 by counters 107. In one embodiment, there is a separate coefficient 127 for each counter 107. In one embodiment, DPE 125 calculates the sum of the products of each coefficient-counter pair. For example, if there are three separate counters 107 and three coefficients 127, the sum is calculated as coefficient_A*counter_A+coefficient_B*counter_B+coefficient_C*counter_C. In other embodiments, other numbers of counters 107 and coefficients 127 may be multiplied together to generate the sum. DPE 125 then generates a power consumption estimate based on this sum accumulated over a given number of clock cycles. It is noted that DPE 125 may be implemented using any suitable combination of software and/or hardware. While DPE 125 is shown as a separate unit within computing system 100, it should be understood that in other embodiments, DPE 125 may be part of or combined with one or more other units of system 100. For example, in another embodiment, DPE 125 and PMU 130 are combined together in a single unit. Other arrangements and/or combinations of components within system 100 are possible and are contemplated.

In one embodiment, during a training phase, DPE 125 compares the power consumption estimate to the actual power consumption data provided by current sense unit 150. In one embodiment, current sense unit 150 generates the actual power consumption data for processing unit 105 using one or more coulomb counters. As used herein, a "coulomb counter" is defined as a device for measuring and maintaining a count of the current used by a device. In one embodiment, a coulomb counter uses a current sense resistor in series with the voltage supplied to the device, and the voltage drop across the resistor is used as a measure of the current. In one embodiment, while system 100 is running a real-world application for an end-user, DPE 125 runs an algorithm which dynamically adjusts coefficients 127 based on the error between the power consumption estimate and the actual power consumption data. By dynamically adjusting coefficients 127, DPE 125 is able to generate a power consumption estimate which tracks the real-time behavior of processing unit 105. Alternatively, another component in system 100 executes the algorithm to dynamically adjust coefficients 127. This dynamic adjustment of coefficients 127 helps to make the predictions generated by DPE 125 more accurate than if coefficients 127 are statically determined and fixed during run-time.

After the dynamic adjustment phase, DPE 125 uses the updated coefficients 127 to generate highly accurate power consumption predictions of processing unit 105. These accurate power consumption predictions help PMU 130 make better decisions when changing the power performance states of the various components of system 100. Additionally, DPE 125 may repeat the dynamic adjustment phase on a regular or flexible interval to keep the coefficients 127 from becoming stale. In some cases, DPE 127 performs the dynamic adjustment phase in response to a given event being detected. For example, in one embodiment, in response to processing unit 105 executing a new application which has not previously been tested, DPE 127 initiates a dynamic adjustment phase so that coefficients 127 can adapt to the new application. Other events for triggering the training phase are possible and are contemplated.

It should be understood that while the connections from power supply 135 to the components of system 100 appear in FIG. 1 as though they share a common trace or bus, this is shown merely for illustrative purposes. The connections from power supply 135 to the various components may be independent of each other and may use separate physical traces, voltage planes, wires, bus pins, backplane connections, or the like. It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. Additionally, it should be understood that connections between components of system 100 may exist but are not shown to avoid obscuring the figure.

The illustrated functionality of computing system 100 may be incorporated upon a single integrated circuit. In another embodiment, the illustrated functionality is incorporated in a chipset on a computer motherboard. In some embodiments, the computing system 100 may be included in a desktop or a server. In yet another embodiment, the illustrated functionality is incorporated one or more semiconductor dies on one or more system-on-chips (SOCs).

Figure 2:
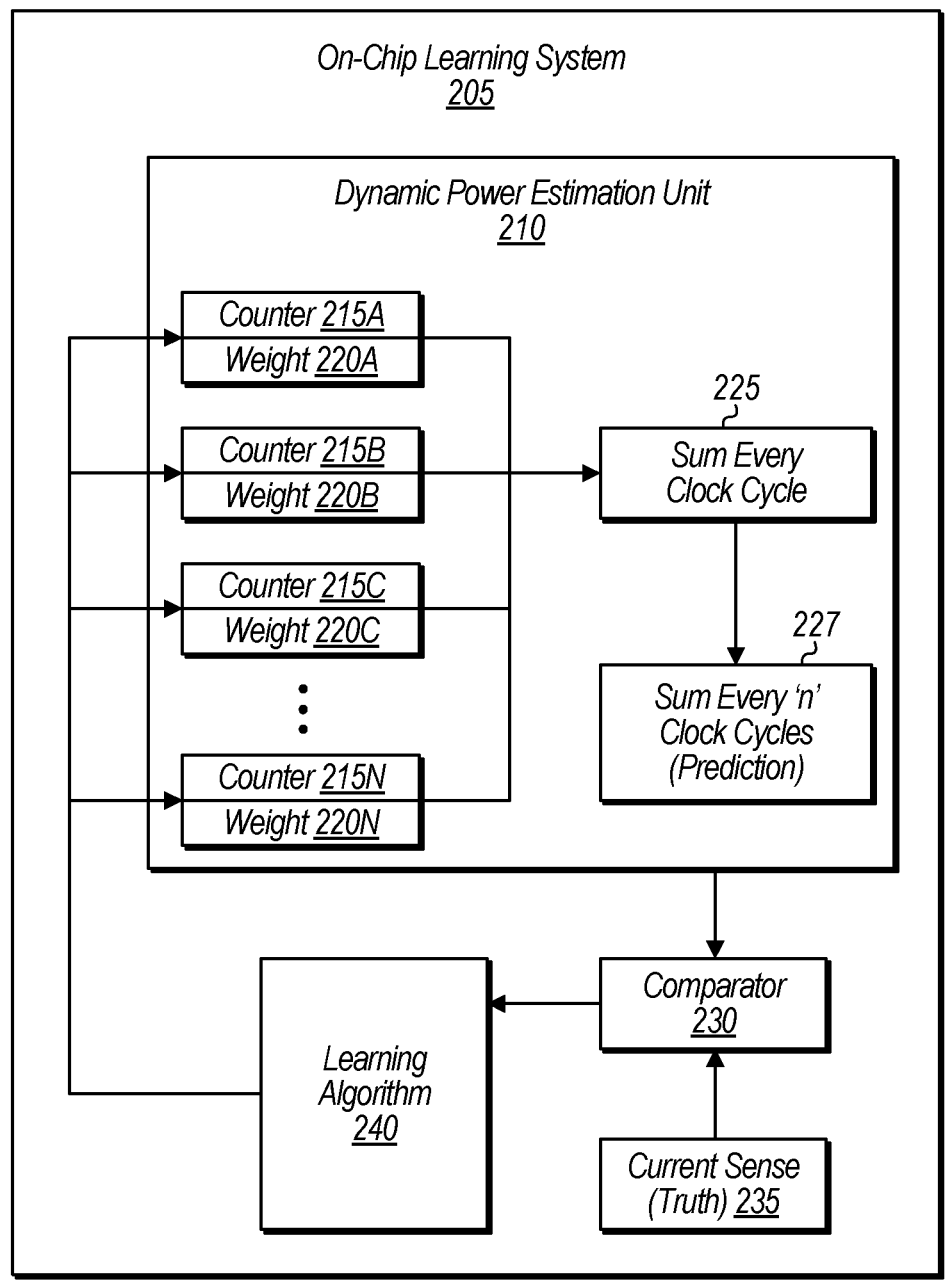
FIG. 2 is a generalized block diagram illustrating one embodiment of an on-chip learning system.

Turning now to FIG. 2, a block diagram of one embodiment of an on-chip learning system 205 is shown. In one embodiment, on-chip learning system 205 is implemented on dynamic power estimator 125 (of FIG. 1). In another embodiment, a first portion of on-chip learning system 205 is implemented on dynamic power estimator 125 and a second portion of on-chip learning system 205 is implemented on processing unit 107 (of FIG. 1). In other embodiments, on-chip learning system 205 is implemented using other components or combinations of components of a computing system. In one embodiment, on-chip learning system 205 is responsible for adjusting the weights 220A-N that are used by dynamic power estimation unit 210 for generating an estimate of the power being consumed by a processing unit or other component. It is noted that weights 220A-N may also be referred to herein as "coefficients". Counters 215A-N are representative of any number of counters which are tracking various metrics associated with the current operating state of the processor. Typically, these counters 215A-N track values which are representative or indicative of the power being consumed by the processor. Examples of events tracked by counters 215A-N include, but are not limited to, instructions executed, cache requests, cache misses, memory requests, branch mispredictions, and so on. It is noted that counters 215A-N may also be referred to as "event counters".

In one embodiment, dynamic power estimation unit 210 includes a weight 220A-N for each counter 215A-N. In one embodiment, each weight 220A-N is multiplied by a corresponding counter 215A-N in each clock cycle. In other embodiments, each weight 220A-N is applied to a corresponding counter 215A-N using a different type of arithmetic or logical operation other than a multiplication operation. In one embodiment, for each clock cycle, adder 225 generates a sum of the products of counters 215A-N being multiplied by the weights 220A-N. Then, adder 227 accumulates the sums provided by adder 225 for "n" clock cycles, where "n" is an integer number that varies according to the embodiment. In some cases, the value of "n" is programmable and is adjusted during runtime. The accumulation output of adder 227 is the prediction of the power consumption for the processing unit (e.g., processing unit 105 of FIG. 1).

The prediction of power consumption is provided to comparator 230. The current sense unit 235 generates a "truth" measure of the power based on the current consumed by the processing unit. This power measurement is sent to comparator 230 to compare against the prediction generated by dynamic power estimation unit 210. The difference between the two values is provided to learning algorithm 240 by comparator 230. Learning algorithm 240 is implemented using any suitable combination of hardware (e.g., control logic) and/or software. For example, learning algorithm may be implemented solely in hardware, solely in software, or with a hybrid hardware/software solution. Learning algorithm 240 uses any of various types of algorithms to adjust weights 220A-N based on the difference between the prediction and the measurement of power consumption. For example, in one embodiment, learning algorithm 240 uses a stochastic gradient descent (SGD) algorithm to adjust and tune the weights 220A-N used by dynamic power estimation unit 210. This tuning of dynamic power estimation unit 210 is intended to make dynamic power estimation unit 210 generate more accurate power consumption predictions in subsequent clock cycles. In other embodiments, other types of algorithms may be used by learning algorithm 240 to adjust the weights 220A-N.

Figure 3:
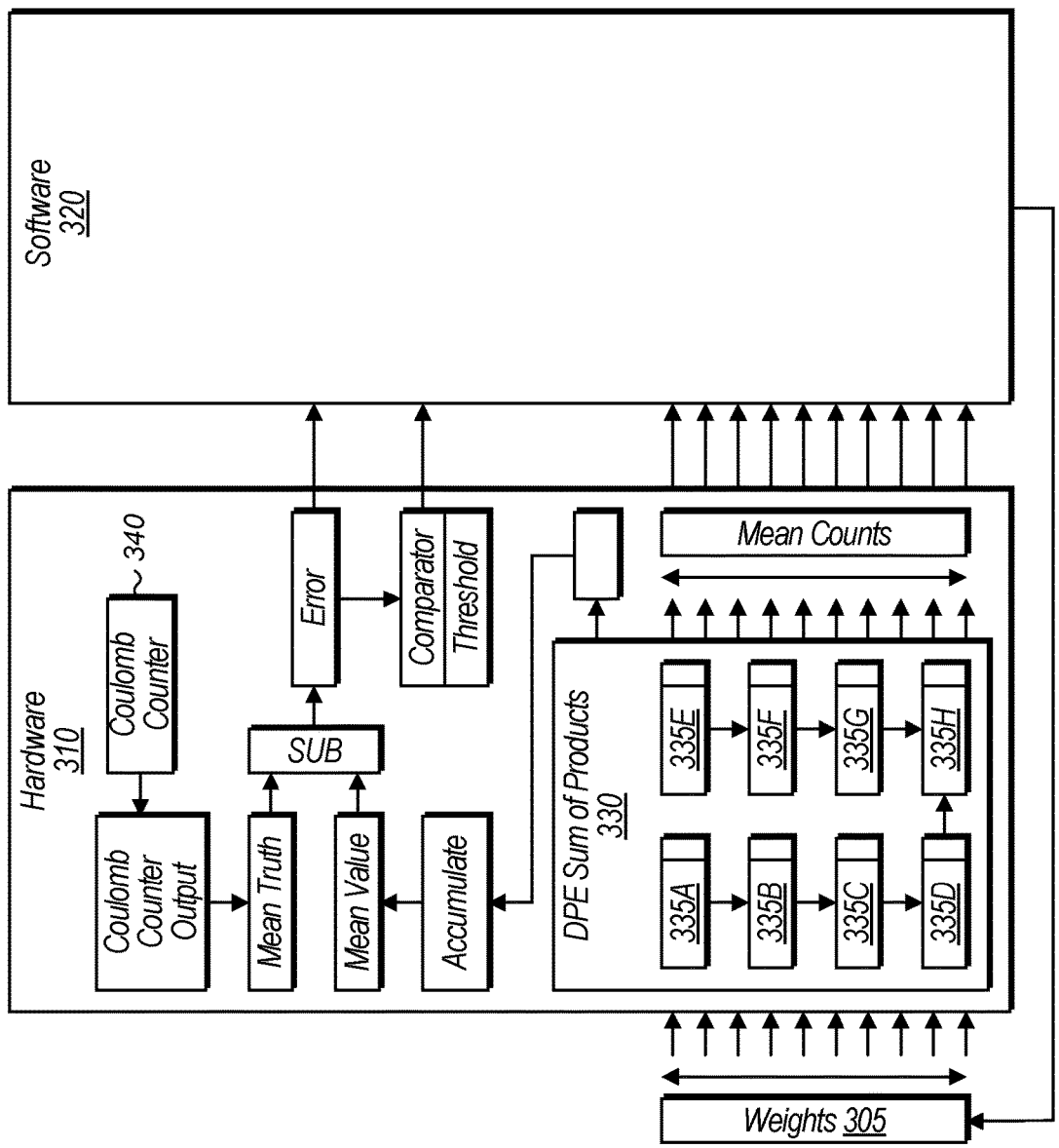
FIG. 3 is a generalized block diagram illustrating one embodiment of a hybrid on-chip learning (OCL) system.

Referring now to FIG. 3, a block diagram of one embodiment of a hybrid on-chip learning (OCL) system 300 for dynamically adapting power estimate weights is shown. In one embodiment, hybrid OCL system 300 includes a combination of hardware 310 and software 320 for dynamically updating weights 305 during run-time. It should be understood that this hybrid hardware/software system is merely one example of an implementation for dynamically adapting power estimate weights. In other embodiments, a purely hardware system or a purely software system may be implemented to dynamically adapt power estimate weights. In one embodiment, each of weights 305 will be greater than or equal to zero. In other words, in this embodiment, weights 305 are non-negative. The hardware 310 includes digital power estimator (DPE) sum of products unit 330 with a plurality of counters 335A-H. The number and type of counters 335A-H varies according to the embodiment. The plurality of counters 335A-H track various events associated with one or more processing units, a system on chip (SoC), an integrated circuit (IC), or other types of components or devices.

In one embodiment, the weights 305 are multiplied by corresponding counters 335A-H to generate a sum which is accumulated and then compared to the truth value generated by coulomb counter 340. In one embodiment, the mean truth value generated by coulomb counter 340 is subtracted from the accumulated sum of products of weights 305 and counters 335A-H. The result of the subtraction is an error which is provided to software 320. The error may also be compared to a threshold, and the result of this comparison is also provided to software 320. In one embodiment, software 320 includes program instructions for initializing the learning algorithm variables for lambda, epsilon, weights, and the learning rate. These program instructions are executable by any type of processor, with the type of processor and ISA varying according to the embodiment.

In one embodiment, software 320 also includes program instructions for updating the weights when the output of the comparator is equal to one. The output of the comparator is equal to one when the error is greater than the threshold. In general, the hardware 310 may use the existing set of weights 305 for as long as the error is less than the threshold. The existing set of weights 305 can also be referred to as a first set of weights. Once the error is greater than or equal to the threshold, the software 320 will initiate an on-chip learning (OCL) routine for dynamically updating weights 305 to create a second set of weights so as to reduce the error between the output of DPE sum of products unit 330 and the measure obtained by coulomb counter 340. In one embodiment, the OCL routine uses a first algorithm for a pretrain mode and a second algorithm for subsequent iterations. In one embodiment, the first algorithm used during the pretrain mode is an adaptive gradient descent algorithm. In this embodiment, the second algorithm used during subsequent iterations is an adaptive delta algorithm. In other embodiments, other types of algorithms may be used for the pretrain mode and/or for subsequent iterations of the OCL routine.

Figure 4:
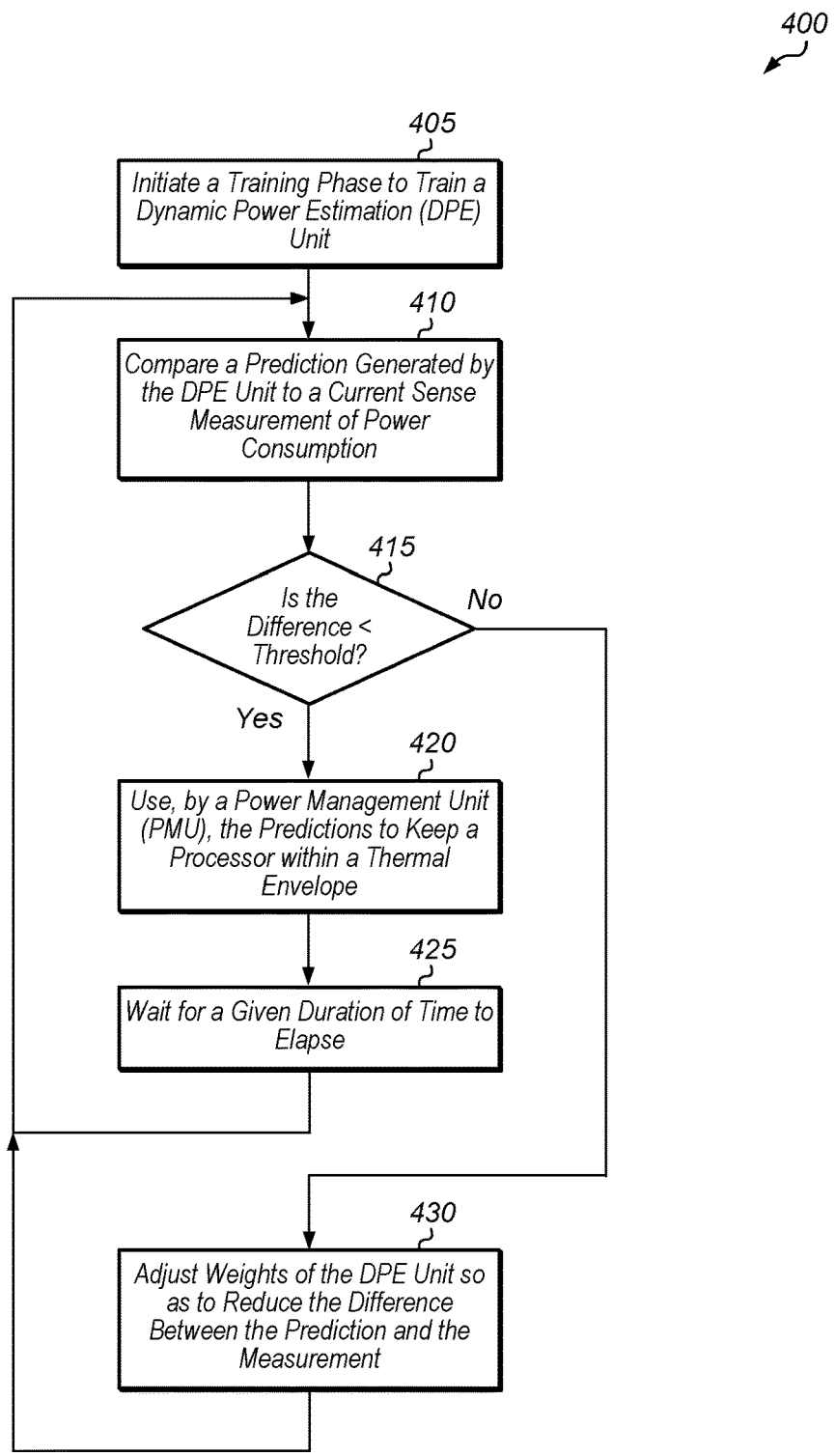
FIG. 4 is a flow diagram of one embodiment of a method for improving the accuracy of a processor power consumption estimate.

Turning now to FIG. 4, one embodiment of a method 400 for improving the accuracy of a processor power consumption estimate is shown. For purposes of discussion, the steps in this embodiment (as well as for FIGS. 5 and 6) are shown in sequential order. However, in other embodiments some steps may occur in a different order than shown, some steps may be performed concurrently, some steps may be combined with other steps, and some steps may be absent.

In various embodiments, a computing system (e.g., computing system 100 of FIG. 1) initiates a training phase to train a dynamic power estimation unit (e.g., dynamic power estimator 125 of FIG. 1) (block 405). Any of various components, such as a processing unit (e.g., processing unit 105), the dynamic power estimation unit, a power management unit (e.g., power management unit 130), or another component may initiate the training phase in block 405. During the training phase, the computing system compares a prediction of the dynamic power estimation unit to a current sense measurement of power consumption (block 410). If the difference between the prediction and the measurement of power consumption is less than a threshold (conditional block 415, "yes" leg), then the predictions by the dynamic power estimation unit are used by a power management unit (PMU) (e.g., PMU 130 of FIG. 1) to keep a processor (e.g., processor 105 of FIG. 1) within a thermal envelope (i.e., thermal design point) (block 420). Otherwise, if the difference between the prediction and the measurement of power consumption is greater than or equal to the threshold (conditional block 415, "no" leg), then a learning algorithm adjusts weights of the dynamic power estimation unit so as to reduce the difference between the prediction and the measurement of power consumption (block 430). One example of implementing a learning algorithm is described by method 600 (of FIG. 6). After block 430, method 400 returns to block 410. After block 420, the computing system waits for a given duration of time to elapse (block 425), and then method 400 returns to block 410.

Figure 5:
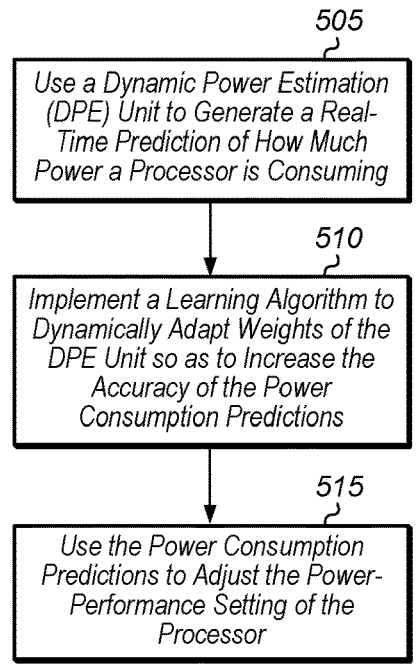
FIG. 5 is a flow diagram of one embodiment of a method for using a learning algorithm to increase the accuracy of power consumption predictions.

Referring now to FIG. 5, one embodiment of a method 500 for using a learning algorithm to increase the accuracy of power consumption predictions is shown. A system (e.g., computing system 100 of FIG. 1) uses a dynamic power estimation (DPE) unit (e.g., dynamic power estimator 125 of FIG. 1) to generate a real-time prediction of how much power a processor (e.g., processor 105 of FIG. 1) is consuming (block 505). Next, the system implements a learning algorithm to dynamically adapt weights of the DPE unit so as to increase the accuracy of the power consumption predictions (block 510). Then, the system uses the power consumption predictions to adjust the power-performance setting of the processor (block 515). For example, in one embodiment, if the power consumption prediction is less than a power consumption target, then the power-performance state of the processor is increased. Otherwise, if the power consumption prediction is greater than the power consumption target, then the power-performance state of the processor is decreased. After block 515, method 500 ends.

Figure 6:
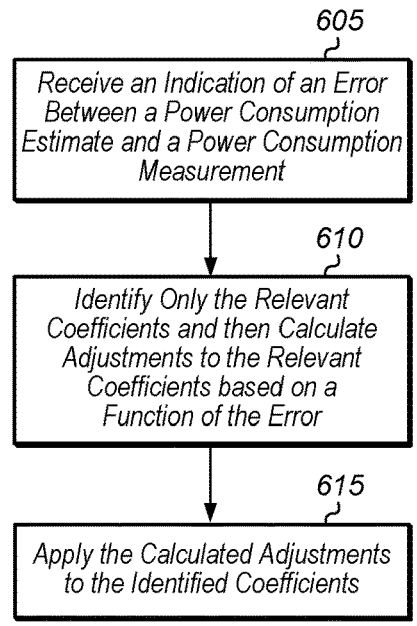
FIG. 6 is a flow diagram of one embodiment of a method for using a learning algorithm to adjust weights.

Turning now to FIG. 6, one embodiment of a method 600 for using a learning algorithm to adjust weights is shown. A learning algorithm receives an indication of an error between a power consumption estimate and a power consumption measurement (block 605). Next, the learning algorithm identifies only the relevant coefficients and then calculates adjustments to the relevant coefficients based on a function of the error (block 610). In one embodiment, a learning rate is applied to the error and then used to calculate the adjustments. Then, the calculated adjustments are applied to the identified coefficients (block 615). After block 615, method 600 ends. After the learning algorithm performs method 600, a dynamic power estimation unit uses the adjusted coefficients to generate more accurate power consumption estimates. It is noted that the learning algorithm may be implemented using any suitable combination of software and/or hardware.

Figure 7:
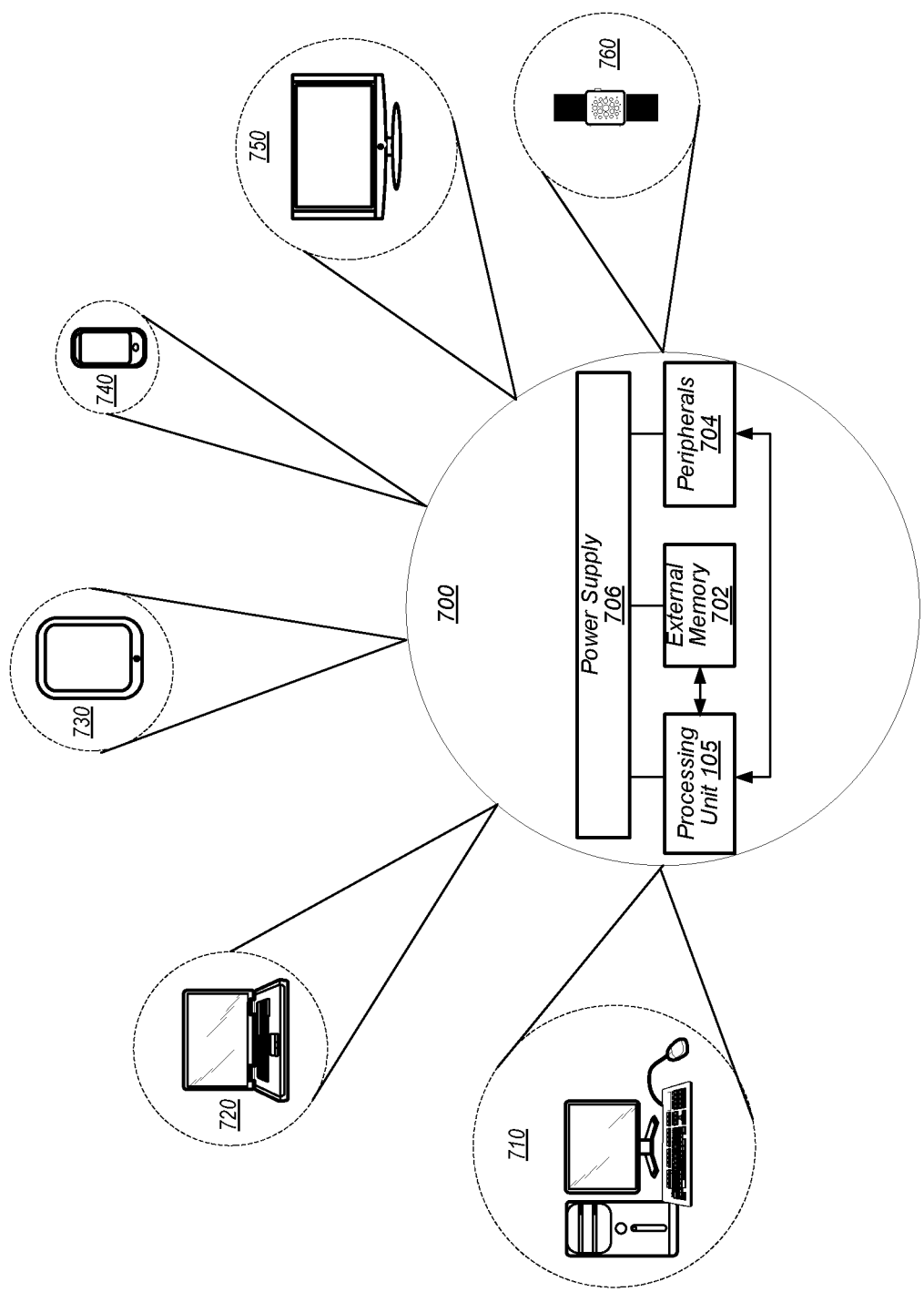
FIG. 7 is a block diagram of one embodiment of a system.

Referring now to FIG. 7, a block diagram of one embodiment of a system 700 is shown. As shown, system 700 may represent chip, circuitry, components, etc., of a desktop computer 710, laptop computer 720, tablet computer 730, cell or mobile phone 740, television 750 (or set top box configured to be coupled to a television), wrist watch or other wearable item 760, or otherwise. Other devices are possible and are contemplated. In the illustrated embodiment, the system 700 includes at least one instance of processing unit 105 (of FIG. 1) coupled to an external memory 702. The processing unit 105 may include or be coupled to a DPE unit and OCL algorithm unit. In various embodiments, processing unit 105 may be included within a system on chip (SoC) or integrated circuit (IC) which is coupled to external memory 702, peripherals 704, and power supply 706.

Processing unit 105 is coupled to one or more peripherals 704 and the external memory 702. A power supply 706 is also provided which supplies the supply voltages to CPU 105 as well as one or more supply voltages to the memory 702 and/or the peripherals 704. In various embodiments, power supply 706 may represent a battery (e.g., a rechargeable battery in a smart phone, laptop or tablet computer). In some embodiments, more than one instance of processing unit 105 may be included (and more than one external memory 702 may be included as well).

The memory 702 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing processing unit 105 in a chip-on-chip configuration, a package-on-package configuration, or a multi-chip module configuration.

The peripherals 704 may include any desired circuitry, depending on the type of system 700. For example, in one embodiment, peripherals 704 may include devices for various types of wireless communication, such as wifi, Bluetooth, cellular, global positioning system, etc. The peripherals 704 may also include additional storage, including RAM storage, solid state storage, or disk storage. The peripherals 704 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a processing unit;
   a dynamic power estimator circuit configured to:
   apply a first set of weights to a plurality of counter values to generate a first prediction of power consumption of the processing unit;
   determine an error of the first prediction of power consumption of the processing unit;
   apply, based on the error, adjustments to the first set of weights to create a second set of weights; and
   apply the second set of weights to the plurality of counter values to generate a second prediction of power consumption of the processing unit; and
   a power management unit configured to adjust a power performance state of the processing unit based on the second prediction of power consumption.

2. The system as recited in claim 1, wherein the plurality of counter values is obtained from a plurality of event counters tracking events associated with operating conditions of the processing unit.

3. The system as recited in claim 1, wherein the dynamic power estimator circuit is configured to determine an error of the first prediction of power consumption of the processing unit by comparing the first prediction to a value of a coulomb counter.

4. The system as recited in claim 1, wherein, based at least in part on a determination that the second prediction of power consumption is less than a threshold, the power management unit is further configured to increase the power performance state of the processing unit.

5. The system as recited in claim 1, wherein, based at least in part on a determination that the second prediction of power consumption is greater than a threshold, the power management unit is further configured to decrease the power performance state of the processing unit.

6. The system as recited in claim 1, wherein, based at least in part on a determination that the error is greater than a threshold, the dynamic power estimator circuit is further configured to apply adjustments to the first set of weights to create the second set of weights.

7. The system as recited in claim 1, wherein, based at least in part on a determination that the processing unit is executing a new application, the dynamic power estimator circuit is further configured to apply adjustments to the first set of weights to create the second set of weights.

8. A method comprising:
   applying, by a dynamic power estimator circuit, a first set of weights to a plurality of counter values to generate a first prediction of power consumption of a processing unit;
   determining, by the dynamic power estimator circuit, an error of the first prediction of power consumption of the processing unit;
   applying, by the dynamic power estimator circuit, adjustments, based on the error, to the first set of weights to create a second set of weights; and
   applying, by the dynamic power estimator circuit, the second set of weights to the plurality of counter values to generate a second prediction of power consumption of the processing unit; and
   adjusting, by a power management unit, a power performance state of the processing unit based on the second prediction of power consumption.

9. The method as recited in claim 8, further comprising receiving the plurality of counter values from a plurality of event counters tracking events associated with operating conditions of the processing unit.

10. The method as recited in claim 8, further comprising determining an error of the first prediction of power consumption of the processing unit by comparing the first prediction to a value generated by a coulomb counter.

11. The method as recited in claim 8, further comprising increasing the power performance state of the processing unit responsive to the second prediction of power consumption being less than a threshold.

12. The method as recited in claim 8, further comprising decreasing the power performance state of the processing unit responsive to the second prediction of power consumption being greater than a threshold.

13. The method as recited in claim 8, further comprising applying adjustments to the first set of weights to create the second set of weights responsive to the error being greater than a threshold.

14. The method as recited in claim 8, further comprising applying adjustments to the first set of weights to create the second set of weights responsive to the processing unit executing a new application.

15. An apparatus comprising:
   a plurality of counters;
   a plurality of weights; and
   circuitry configured to:
      multiply the plurality of weights by the plurality of counters to generate a first prediction of power consumption;
      receive an indication of an error of the first prediction of power consumption;
      apply, based on the error, adjustments to the plurality of weights; and
      after the adjustments to the plurality of weights, multiply the plurality of weights by the plurality of counters to generate a second prediction of power consumption.

16. The apparatus as recited in claim 15, wherein the plurality of counter values is obtained from a plurality of event counters tracking events associated with operating conditions of a component.

17. The apparatus as recited in claim 15, wherein the apparatus further comprises a comparator configured to generate the error of the first prediction of power consumption.

18. The apparatus as recited in claim 17, wherein to generate the error, the comparator is further configured to compare the first prediction of power consumption to a value generated by a coulomb counter.

19. The apparatus as recited in claim 15, wherein the circuitry is further configured to convey the second prediction of power consumption to a power management unit.

20. The apparatus as recited in claim 15, wherein, based at least in part on a determination that the error is greater than a threshold, the circuitry is further configured to apply adjustments to the plurality of weights.

* * * * *

UNITED STATES PATENT AND TRADEMARK OFFICE
CERTIFICATE OF CORRECTION

PATENT NO. : 10,948,957 B1
APPLICATION NO. : 16/584202
DATED : March 16, 2021
INVENTOR(S) : Chaouat et al.

Page 1 of 1

It is certified that error appears in the above-identified patent and that said Letters Patent is hereby corrected as shown below:

In the Specification

Column 5, Line 18, delete "DPE 127" and substitute -- DPE 125 --.

Column 5, Line 22, delete "DPE 127" and substitute -- DPE 125 --.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*